United States Patent [19]

Hayakawa

[11] Patent Number: 4,808,809

[45] Date of Patent: Feb. 28, 1989

[54] DEVICE FOR OPTICALLY DETECTING THE PRESENCE OR ABSENCE OF AN OBJECT ON AN OPTICAL PATH INCLUDING A VARIABLE I-V CHARACTERISTIC CIRCUIT TO EFFECT IN A POSITIVE FEEDBACK RELATIONSHIP BETWEEN THE RADIATION SOURCE AND THE RADIATION DETECTOR

[75] Inventor: Wataru Hayakawa, Odawara, Japan

[73] Assignee: Hitachi, Ltd., Tokyo, Japan

[21] Appl. No.: 935,172

[22] Filed: Nov. 26, 1986

[30] Foreign Application Priority Data

Nov. 27, 1985 [JP] Japan .................. 60-266928

[51] Int. Cl.⁴ .............................................. G01J 1/32
[52] U.S. Cl. .................................. 250/205; 250/214 R
[58] Field of Search ............... 250/205, 214 R, 221, 250/222.1; 302/311; 315/149

[56] References Cited

U.S. PATENT DOCUMENTS

| | | | |
|---|---|---|---|
| 4,194,481 | 3/1980 | Leblanc et al. | 307/311 |
| 4,254,364 | 3/1981 | Flint et al. | 250/205 |
| 4,270,046 | 5/1981 | Werking | 250/214 R |
| 4,365,164 | 12/1982 | Sibley | 307/311 |
| 4,629,880 | 12/1986 | Zimmerman | 250/205 |
| 4,649,267 | 3/1987 | Ray | 250/205 |
| 4,649,302 | 3/1987 | Damiano et al. | 307/311 |
| 4,682,061 | 7/1987 | Donovan | 307/311 |
| 4,687,956 | 8/1987 | Itoh | 307/311 |

Primary Examiner—David C. Nelms
Assistant Examiner—William L. Oen
Attorney, Agent, or Firm—Antonelli, Terry & Wands

[57] ABSTRACT

A detection system including a radiation source and a radiation detector wherein the output of the radiation detector is positively fed back to the radiation source through a variable voltage/current controlling unit thereby providing a rapid and reliable detection signal on the current path for supplying a current to the radiation source. The variable voltage/current controlling unit may be, for example a parallel connection of a Zener diode or resistor and a bipolar junction transistor or FET controlled by the current output from the radiation detector. The radiation source part and the radiation detector part can be electrically connected to reduce the number of lead wires.

22 Claims, 5 Drawing Sheets

FIG. IA
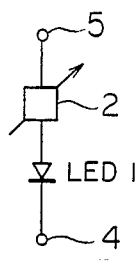
FIG. IB
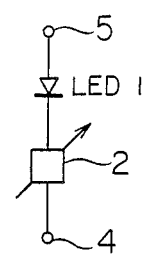
FIG. IC
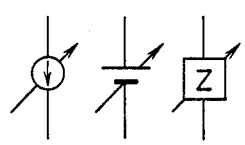
FIG. 2
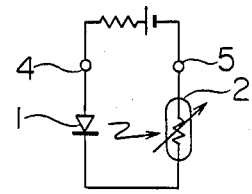
FIG. 3A
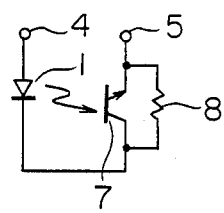
FIG. 3B
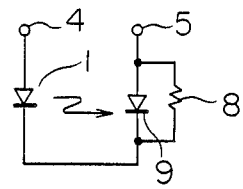
FIG. 4A
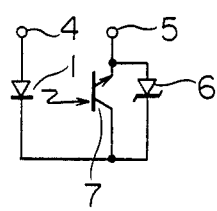
FIG. 4B
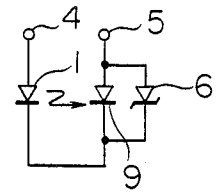

DEVICE FOR OPTICALLY DETECTING THE PRESENCE OR ABSENCE OF AN OBJECT ON AN OPTICAL PATH INCLUDING A VARIABLE I-V CHARACTERISTIC CIRCUIT TO EFFECT IN A POSITIVE FEEDBACK RELATIONSHIP BETWEEN THE RADIATION SOURCE AND THE RADIATION DETECTOR

BACKGROUND OF THE INVENTION

1. Field of the Invention

The present invention relates to a system or device for optically detecting an object and more particularly to a system or device for optically detecting an object, which system or device has a simple structure and which can be easily handled.

2. Description of the Related Art

Various structures are known as devices for detecting the existence of an object. For the purpose of detecting an object without affecting the object to be detected, a noncontact detector may be desirable.

A radiation transmitting photoelectric converter, such as a photo-coupler or photo-interrupter, having a radiation source section and a radiation detector section can be used for signal transmission or object detection system, for example. In such a photoelectric converter, the radiation source section and the radiation detector section co-operate to produce an electrical output through optical coupling. Basically the radiation source section includes a set of current supply leads and a radiation source element, whereas the radiation detector section includes a set of power supply leads, a radiation detector element, and an output signal lead connected to the coupling point between those elements. When the output signal is desired to have a higher transition signal level, an amplifier element is further incorporated. Assuming that the number of outgoing leads is five or more, for example, five or more coupling components and five or more coupling or assembling manpower steps are required.

For example, in an automatic machine for transporting or working an object or objects, a number of devices for optically detecting an object are used for operation control. When 100 optically object-detecting devices, each having five leads, are used, 500 leads are required, resulting in many connecting parts, much material, much man-power and space.

When it is determined whether an object is present or not, the signal is desired to be stable in each state and clearly change in transition in accordance with the presence or absence of an object. In the prior art, a stable and highly reliable signal was derived by amplifying the output of the photo-interrupter in a Schmitt trigger circuit.

As for the general knowledge of the prior art, reference may be made to circuit diagrams shown in data books or manuals of various manufactures such as "Photosemiconductor elements Data book" and "Semiconductor News No. 35" both published by Matsushita Electronics Corp.

SUMMARY OF THE INVENTION

An object of the present invention is to provide a system or device for optically detecting an object, which is simple in structure and easy in mounting process.

Another object of the present invention is to provide a small-sized, highly reliable device for optically detecting an object which is effective to realization of small-sized, highly reliable automation apparatuses.

In accordance with one aspect of the present invention, a radiation detector section and a radiation source section constitute a positive feedback loop to provide a device for optically detecting an object capable of generating a detection signal with high reliability and with quick response.

This positive feedback loop preferably includes a variable electricity-controlling element assuming alternatively one of two electrical states, such as high and low voltages, large and small currents, etc. When radiation has been detected, the positive feedback loop preferably assumes a large current state to further increase the radiation. When interruption of radiation has been detected, the positive feedback preferably assumes a small current state to reduce radiation. A voltage signal and a current signal can be easily transformed mutually, e.g. by passing through a resistor. Electricity control can mean either of voltage control or current control or both.

Further, the radiation source section is linked to the radiation detector section electrically as well, the number of outgoing leads being reduced.

BRIEF DESCRIPTION OF THE DRAWINGS

FIGS. 1A and 1B are circuit diagrams for illustrating the simplest embodiments of the present invention.

FIG. 1C shows examples of electricity control means.

FIG. 2 shows an example of the embodiment illustrated in FIG. 1B.

FIGS. 3A and 3B are circuit diagrams of an embodiment wherein a parallel circuit of an optical active element and a resistor is connected in series with a radiation source.

FIGS. 4A and 4B show embodiments using a parallel circuit of a constant voltage element and an optical active element as the load of a light emitting diode (LED).

DESCRIPTION OF THE PREFERRED EMBODIMENTS

Figure 12:
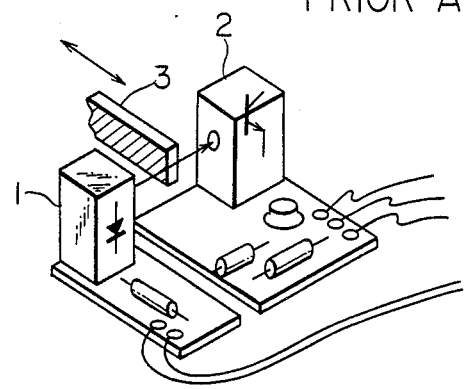
FIG. 12 is a perspective view of a device for optically detecting an object according to the prior art.
Figure 13:
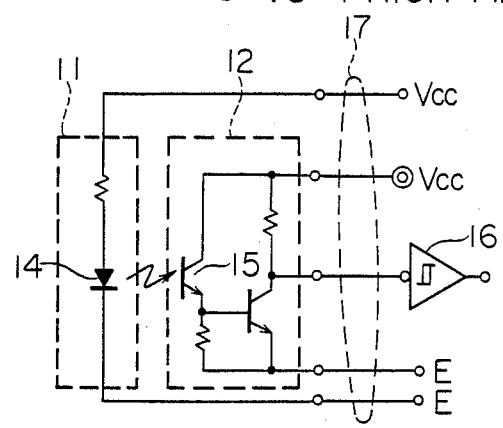
FIG. 13 is a circuit diagram of the device illustrated in FIG. 12.

In order to facilitate understanding of the present invention, an example of a system or device for optically detecting an object of the prior art will at first be described by referring to FIGS. 12 and 13. The device of FIG. 12 is composed of a radiation source 1 supplied with electric power through two connection leads and a radiation detector 2 for receiving the radiation from the radiation source 1 and supplying the quantity of received light as a signal. Numeral 3 of FIG. 12 denotes an object to be detected.

Equivalent circuits of the radiation source 1 and the radiation detector 2 are shown in FIG. 13. The radiation source section 11 includes a radiation source element 14 such as a light emitting diode. And the radiation detector section 12 includes a radiation detector element 15 such as a phototransistor. An example of such combination includes a GaAs LED and a Si pin diode. Numeral 17 denotes power supply loads required to activate this optical device for detecting an object and signal leads for coupling the detected output to a receiving circuit 16 included in the main body of the automation apparatus. In this example, five leads are used.

Apart from the conventional concept of the photointerrupter or the photo-coupler, the present inventor has analyzed and studied what is necessary and what is desirable for detecting the existence of an object in an optical path.

Two current terminals are required to allow a current to flow for energizing an electrical part. However, since one of the two current terminals may be grounded to a common potential, the minimum number of leads would be one. If one lead suffices for the operation of one detector, an extremely significant advantage is obtained in an apparatus using a number of detectors. In such a case, the connection terminal of one lead must serve also as the signal output terminal simultaneously. This means that the connection terminal for the radiation source element serves also as the signal output terminal. Although this concept was not found in the prior art, the present inventor pursued its possibility. As radiation source elements, semiconductor light emitting diodes and semiconductor laser diodes are widely used. Each of these elements is a diode of forward operation having a forward voltage drop which does not depend heavily on the current level. If a voltage signal is to be produced at the output, it is desirable to place a load the terminal voltage of which may change explicity.

FIGS. 1A and 1B shows the first embodiment of the present invention. A radiation source element 1 and a variable I-V characteristic load 2 are connected in series between terminals 4 and 5, which are to be connected between power source terminals through an external load. If the variable I-V characteristic load 2 is so controlled depending upon whether the object to be detected is present or not that the voltage or current between the terminals 4 and 5 may be changed, the presence or absence of the object can be detected. FIG. 1C shows a variable current element on left, a variable voltage element in the middle and a variable impedance element on right, as examples of the variable I-V characteristic.

FIG. 2 shows an example of the simplest configuration. A light emitting diode 1 and a photoresistor 2 are connected in series between the terminals 4 and 5. If the radiation from the radiation source 1 is applied to the photoresistor (or photoconductor) 2, the resistance of the photoresistor 2 is lowered to let flow a larger current through the light emitting diode 1. In this way, the presence or absence of the object on the optical path and the quantity of light emitted from the radiation source effect a positive feedback to each other. A normally-on junction FET having a radiation sensitive gate junction may also be used in this mode of operation.

FIG. 3A shows an example in which a phototransistor 7 together with a parallel resistor 8 is used instead of the photoresistor 2 shown in FIG. 2. When radiation is not applied to the phototransistor 7, it has a high impedance value and assumes a substantially insulating state. Therefore, a resistor 8 is connected in parallel to the transistor 7 for stabilizing the potential. When sufficient quantity of light is applied to the phototransistor 7, the impedance of the phototransistor 7 becomes very low to allow a large current to flow therethrough. Here, the impedance of the phototransistor 7 acts as a shunt impedance for the resistor 8. When the quantity of applied light is reduced to increase the impedance of the phototransistor 7, however, the resistor 8 functions to assure a sufficient current for emitting the radiation.

FIG. 3B shows an example in which a photodiode 9 together with a parallel resistor 8 is used instead of the photoresistor 2 illustrated in FIG. 2. The photodiode 9 is preferably a reverse-biased avalanche diode, the internal impedance of which is reduced upon incidence of radiation. The operation of the circuit shown in FIG. 3B is nearly the same as that of FIG. 3A.

In FIGS. 3A and 3B, the current flowing through the phototransistor 7 or the photodiode 9 is increased or reduced depending upon an increase or decrease in the quantity of incident light. In the example of FIG. 4A, the response to the quantity of incident light is provided with switching characteristics. A parallel connection of the phototransistor 7 and a Zener diode 6 is connected in series with the light emitting diode 1 between the terminals 4 and 5, which are to be connected to a power source through an external load. This circuit looks like a series connection of the LED 1 and the Zener diode 6 when radiation is not incident upon the phototransistor 7. At this time, both the LED 1 and the Zener diode 6 can be regarded as constant voltage elements. And the voltage between the terminals 4 and 5 can be expressed as $$V_{4-5} = V_{LED} + V_z$$

where
$V_{4-5}$: voltage between terminals 4 and 5,
$V_{LED}$: terminal voltage of the LED 1,
$V_z$: terminal voltage of the Zener diode 6.

When the quantity of light incident upon the phototransistor 7 is sufficiently large, the emitter to collector voltage $V_{CE}$ of the phototransistor 7 becomes sufficiently low such that $$V_{4-5} = V_{LED} + V_{CE}$$

where $V_{CE}$: emitter to collector voltage of the phototransistor 7.

It is evident to those skilled in the art that a photodiode 9 may be used instead of the phototransistor, as shown in FIG. 4B.

In these examples, the radiation source element and variable I-V characteristic means are connected in series between two terminals. When the state of variable I-V characteristic means is changed, the voltage drop or current between the terminals is changed. By taking out or outputting the change as a signal, it can be determined as to whether or not an object is present or not on the optical path.

For stabilizing the output signal, it is effective to use an amplifier. When an object is not present on the optical path and radiation from the radiation source 1 is applied to the radiation detector, it is especially effective to short-circuit the bias source for the radiation source element 1 with a different and sufficiently low bias source.

Figure 5A:
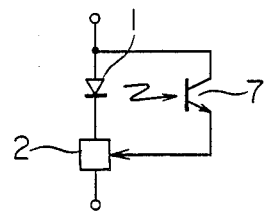
FIGS. 5A and 5B are circuit diagrams of an embodiment wherein the variable I-V characteristic is controlled by a radiation detector element.
Figure 5B:
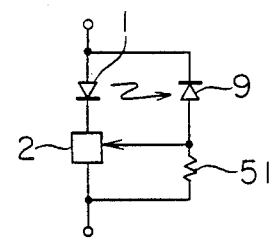

FIGS. 5A and 5B show circuits in which the radiation detector section and the bias section of the light emitting diode are provided separately. In FIG. 5A, the output current of the radiation detector section exemplified by the phototransistor 7 is used as the control signal for the variable electricity (I-V characteristic) unit 2. In an example shown in FIG. 5B, the current signal of the radiation detector exemplified by the photodiode 9 is converted into a voltage signal by a load resistor 51. The resultant voltage signal is used to control the variable I-V characteristic unit 2. The configuration of FIG. 5B is suitable to a case where an element having a high input impedance such as an insulated gate field effect transistor (IGFET) is controlled.

Figure 6A:
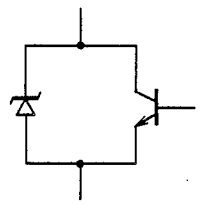
FIGS. 6A to 6C show examples of the variable I-V characteristic.
Figure 6B:
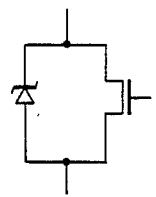
Figure 6C:
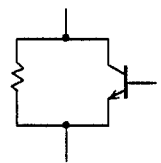

FIGS. 6A to 6C show examples of the variable. I-V characteristic unit 2. FIG. 6A shows a parallel connection of a Zener diode and a bipolar junction transistor. FIG. 6B shows a parallel connection of a Zener diode and an IGFET. As described before with reference to FIG. 4A, the terminal voltage assumes the Zener voltage $V_z$ under one (radiation interruption) state, under the other (radiation detection) state, the terminal voltage assumes the ON-state voltage $V_{CE}$ ($V_{SD}$) of the transistor.

FIG. 6C shows an example in which a resistor is used instead of the Zener diode. In this case, the constant voltage characteristics under one (radiation interruption) state are lost. However, it is also possible to obtain the significant I-V characteristic change for discriminating the status of the presence or absence of an object in an optical path.

Figure 7:
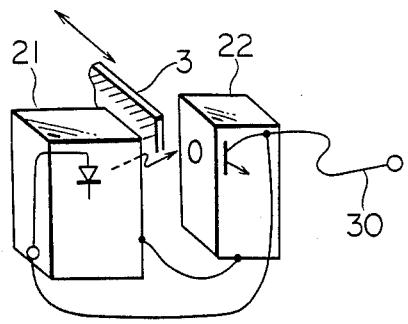
FIG. 7 is a perspective view of a system or device for optically detecting an object according to an embodiment of the present invention.
Figure 8A:
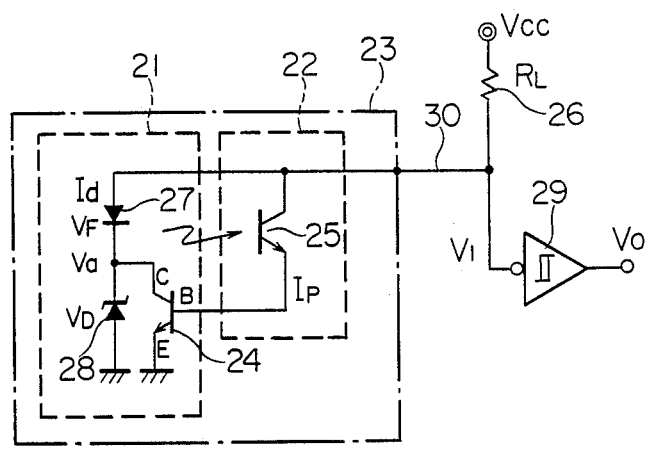
FIGS. 8A and 8B are circuit diagrams of the device shown in FIG. 7.
Figure 8B:
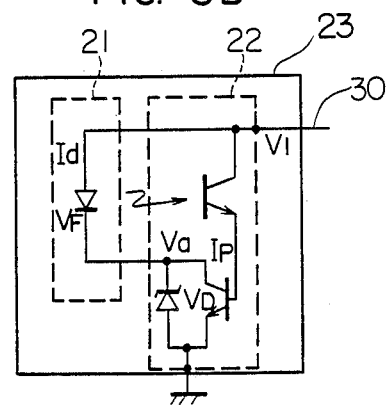

FIG. 7 is an perspective view of a system or device for optically detecting an object according to an embodiment of the present invention. FIGS. 8A and 8B are circuit diagrams of the device shown in FIG. 7. In FIG. 7, a radiation source 21 is confronted by a radiation detector 22. When an object 3 to be detected is not present on the optical path, the radiation from the radiation source 21 is applied to the radiation detector 22. A system or device 23 for optically detecting an object including the radiation source 21 and the radiation detector 22 is connected to the control section of the automation apparatus through a single lead 30 which serves as both the power supply lead and the detected output signal lead. The ground potential common to respective devices for optically detecting an object is used as the return path of power. The object 3 to be detected may be a manufactured article on a belt conveyor or a card or a bill in an ATM (automated teller machine), for example. The radiation source 21 and the radiation detector 22 may be incorporated into one body.

An embodiment of the internal circuit of the detecting device 23 is shown in FIG. 8A. Within the radiation source 21, a parallel connection of a constant voltage element 28 exemplified by a Zener diode and a current-controlled active element 24 exemplified by a bipolar junction transistor is connected between the cathode of a light emitting diode 27 and the ground or common potential. In the radiation detector 22, a radiation detector element 25 exemplified by a phototransistor is connected to the power supply lead. The other end of the radiation detector element is connected to the radiation source 21 as the output of the radiation detector 22. The light emitting diode may alternatively be disposed at the ground side as shown in FIG. 1A.

The output 30 of the device 23 is connected to the power supply ($V_{cc}$) through a load impedance 26 exemplified by a resistor and to the input of a receiver circuit 29 exemplified by a Schmitt trigger.

The light emitting diode 27 is preferably formed of a semiconductor of III-V family such as GaAs. And the phototransistor 25 of the radiation detector is preferably formed of a semiconductor having a narrower bandgap such as Si. When the circuit of FIG. 8A is integrated, therefore, parts excepting the light emitting diode can be integrated into one chip. In this case, respective internal circuits of the radiation source 21 and the radiation detector 22 are preferably constituted as shown in FIG. 8B. The circuit of the device 23 is the same as that of FIG. 8A.

In the circuits shown in FIGS. 8A and 8B, the anode side of the light emitting diode 27 connected in series with the constant voltage diode 28 is connected to the power supply ($V_{cc}$) through the resistor 26. When the transistor 24 is turned off to prevent a current through the transistor, the current Id flowing through the light emitting diode can be represented as $$I_d = \frac{V_{cc} - V_D - V_F}{R_L}$$

where:
$V_D$ = characteristic voltage (Zener voltage, for example) of the constant voltage diode 28,
$V_F$ = forward voltage drop of the light emitting diode (typically 1 to 2 V),
$V_{cc}$ = power supply voltage,
$R_L$ = impedance of the resistor 26.

That is to say, the current flowing through the light emitting diode under the radiation interruption state is defined by the power supply voltage $V_{cc}$ minus the sum of the voltage drop $V_F$ of the light emitting diode 27 and the voltage drop $V_D$ of the Zener diode 28, divided by the impedance $R_L$ at the power supply side.

The collector to emitter path of the transistor 24 is connected in parallel to the constant voltage diode 28, and the base of the transistor 24 is connected to the output of the phototransistor 25. The optical detection signal is supplied from the power supply $V_{cc}$ to the transistor 24 through the resistor 26 and the power supply lead 30.

Figure 9:
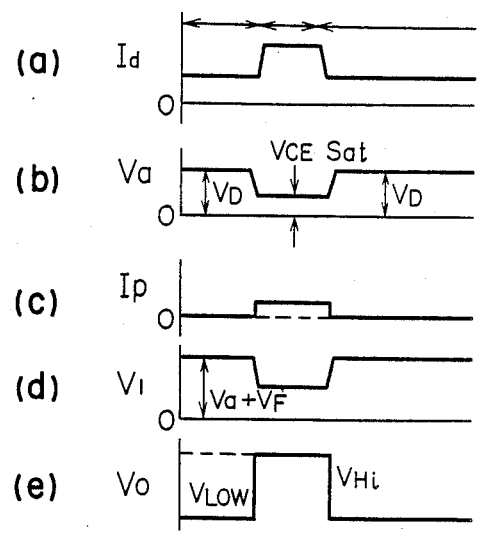
FIG. 9 shows current and voltage waveforms appearing at various points in the circuits of FIGS. 8A and 8B.

The operation of the circuit of FIG. 8A will now be described by referring to FIG. 9. The radiation emitted from the LED 27 is designed to be received by the phototransistor 25 in the radiation detector 22. If the radiation is interrupted by an object 3 existing between the radiation source 21 and the radiation detector 22, the impedance value of the phototransistor 25 is high and the current $I_p$ flowing through the phototransistor consists of only the dark current. When the object 3 is moved to sufficiently pass the radiation from the radiation source 21 to the radiation detector 22 (radiation detection state), the impedance of the phototransistor 25 is lowered to increase the $I_p$ component flowing a path represented as: power supply→resistor 26→phototransistor 25→base of transistor 24→ground. Since the current $I_p$ is the base current of the transistor 24, the amplified collector current $I_c$ represented as $$I_c = \beta \cdot I_p$$

flows through the transistor 24, where the letter $\beta$ is the current amplification factor. The collector current $I_c$ constitutes the current $I_d$ of the light emitting diode in conjunction with the current $I_z$ of the Zener diode.

While the current flows through the Zener diode, its terminal voltage is $V_D$. The current $I_d$ flowing through the light emitting diode is represented as $$I_d = \frac{V_{cc} - V_D - V_F}{R_L}.$$

That is to say, the current $I_d$ flowing through the light emitting diode 27 is not changed. When the emitter to collector voltage $V_{CE}$ of the transistor 24 becomes definitely smaller than the Zener voltage $V_D$ due to increase in the quantity of received light, the current $I_d$ flowing through the light emitting diode 27 will no longer flow through the constant voltage diode 28 but will flow only through the transistor 24. Of course, there may be a transient state. An increase in current causes an increase in the quantity of radiated light. Accordingly, the quantity of received light and hence the current $I_p$ are increased. This results in an increase in the current $I_d$ flowing through the light emitting diode 27 as shown at curve (a) in FIG. 9. Since significant positive feedback is thus caused between the quantity of received light and the radiation source exciting or energizing current, the transistor 24 is completely turned on and comes into the saturation state. The emitter to collector voltage of the transistor 24 becomes equal to $V_{CE\,sat}$. The positive feedback brings about stable and rapid circuit operation.

In a region between the threshold voltage $V_D$ defined by the characteristics of the constant voltage diode 28 and the threshold voltage defined by the above described $V_{CE\,sat}$, positive feedback is thus caused between the quantity of light radiated by the light emitting diode 27 and the quantity of light received by the phototransistor 25. The potential $V_a$ at the coupling point between the light emitting diode and the Zener diode rapidly changes from the Zener voltage $V_D$ defined by the characteristics of the constant voltage diode 28 to the above described $V_{CE\,sat}$ defined by the saturation characteristics of the transistor 24 as shown in FIG. 9(b). When the radiation transmission state is replaced by the radiation interruption state due to movement of the object, the potential on the contrary rapidly changes from $V_{CE\,sat}$ to $V_D$ as shown in FIG. 9(b).

Assuming that a constant voltage diode having $V_D = 2.1$ V is used as the constant voltage diode 28 and a transistor having $V_{CE\,sat} = 0.3$ V is used as the transistor 24, for example, the amplitude of the swing of the output signal becomes $2.1 - 0.3 = 1.8$ V. Assuming that the power supply voltage is 5 V and $V_F = 1.2$ V, the current $I_d$ of the light emitting diode under the radiation interruption state is represented as $$I_d = \frac{V_{cc} - V_D - V_F}{R_L} = \frac{1.7}{R_L}$$

and $V_a = 2.1$ V.

The current $I_d'$ under the radiation transmission state is represented as $$I_d' = \frac{V_{cc} - V_{CE\,sat} - V_F}{R_L} = \frac{3.5}{R_L}$$

and $V_a = 0.3$ V.

The current of the radiation source element under the radiation transmission state becomes nearly twice that under the radiation interruption state. Since this change in quantity of radiated light functions to stabilize the detected signal having amplitude of 1.8 V, an object can be detected with extremely high reliability.

When the radiation interruption state is replaced by the radiation transmission state, the current $I_d$ flowing through the light emitting diode 27 largely changes as represented by $I_d$ and $I_d'$.

The circuit voltage $V_a$ of the radiation source 21 approaches $V_D$ and $V_{CE\,sat}$ under the radiation interruption state and the radiation transmission state. The detected signal voltage $V_i$ of the device for optically detecting an object 23 is represented as $$V_i \approx V_a + V_F$$

as shown in FIG. 9(d).

Under the radiation interruption state, the current $I_p$ flowing through the phototransistor 25 comprises only the dark current and is nearly zero. Under the radiation transmission state, the current $I_p$ becomes large enough to saturate the transistor 24 according to the quantity of received light as shown in FIG. 9(c).

The detected signal voltage $V_i$ transmitted to the receiving station circuit 29 within the automation apparatus via a single signal lead may further be amplified by the Schmitt trigger 29. The voltage $V_i$ is easily amplified to such a level as to facilitate distinguishment between the radiation interruption state and the radiation transmission state. Thus, it is possible to produce state signals $V_{LOW}$ and $V_{HI}$ as shown in FIG. 9(e) in response to respective states.

Figure 10:
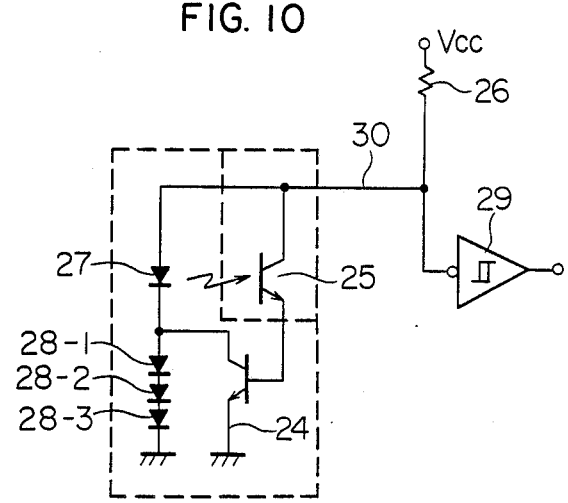
FIG. 10 is a circuit diagram for illustrating another embodiment of the present invention.

FIG. 10 shows another embodiment of the present invention, in which n diodes 28-1 to 28-n are employed as constant voltage elements to provide forward voltage drop instead of a constant voltage diode 28 used in the above described embodiments. The p-n junction of a typical silicon diode has a forward voltage drop of about 0.7 V per diode. For example, the voltage corresponding to $V_D = 2.1$ V can be formed by connecting three diodes described above in series.

As evident from the above description, all of electronic circuit parts of the radiation source and the radiation detector can be constituted by semiconductor elements. Further, most parts of the circuit can be integrated by using the semiconductor integrated circuit technique. As described before with reference to the embodiment of FIG. 8B, the circuit excepting the radiation source 21, i.e., the radiation detector section 22 can be formed on one chip of semiconductor (e.g. Si) substrate. In addition, it is also possible to integrate the entire detecting device by using the heterojunction technique.

Figure 11:
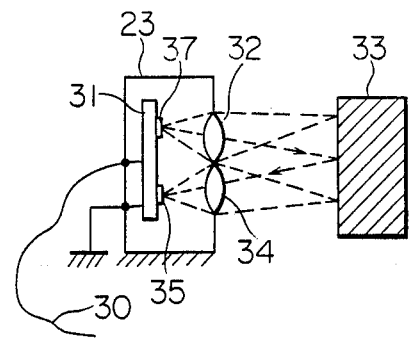
FIG. 11 shows the configuration of still another embodiment of the present invention.

FIG. 11 shows an embodiment of reflection type. The radiation projected from a light emitting diode chip 37 through a lens 32 is reflected at the surface of an object existing on a rail, for example. The reflected radiation is condensed by a condenser 34 and sensed by a part corresponding to the phototransistor on a semiconductor substrate 35. The output signal is sent out via a signal lead 30 which serves also as the power supply lead. Unless the object 33 is present, the radiation is neither reflected nor received. In this embodiment, however, the signal is apt to vary according to the state of the optical reflecting characteristics of the reflector 33.

In the configuration of the embodiment of FIG. 11, the radiation reflected by the object 33 is detected. Alternatively, it is possible to dispose a reflecting mirror to detect the radiation transmitted through the object. The radiation outgoing from the lens 32 is reflected by a reflecting mirror and then returned to the radiation detector through the lens 34. If the object 33 is present in the optical path, the reflected radiation is not returned. That is to say, the radiation interruption state or the radiation transmission state of the object 33 is detected. This configuration is advantageous in that a variation in the quantity of light due to the attitude and passage position of the object 33 is not present.

Since the system for optically detecting object can be formed in a single body, this embodiment is advantageous in reducing the size of an automation apparatus and enhancing its function. Cost reduction is also attained by circuit integration.

The lead wire for the detected signal of the device for optically detecting an object according to the present invention can also be used as the power supply lead. As the power supply lead and the signal lead for the radiation source section and the radiation detector section of the device for optically detecting object, a single lead suffices for one set of the radiation source section and the radiation detector section. Accordingly, the number of connection leads can be drastically reduced. Significant advantage is thus obtained in an automation apparatus or an automation system using a number of devices for optically detecting an object.

In addition, at least a large portion of electronic circuit components of the device for optically detecting an object can be integrated by using the semiconductor integrated circuit technique. And it becomes possible to eliminate the connection of discrete components, reduce the fabrication steps and reduce the size of apparatus. Since the output signal lead can be terminated by a low impedance element in each state, less distortion is caused in the transmission waveform, resulting in high reliability.

I claim:

1. A device for optically detecting the presence or absence of an object on an optical path, comprising:
   a first terminal adapted for applying thereat a first reference voltage signal;
   a second terminal adapted for applying thereat a second reference voltage value through a load;
   a radiation source circuit coupled between said first and second terminals, said radiation source circuit including a series connection of a radiation source for emitting radiation by electrical excitation and variable current-voltage (I-V) characteristics means for passing the radiation source excitation current therethrough and being responsive to a control signal for controlling its I-V characteristic; and
   a radiation detector circuit including a radiation detector positionally disposed for defining said optical path from said radiation source to the radiation detector and for receiving the radiation emitted from said radiation source through the optical path, said radiation detector circuit generating an output corresponding to said control signal for controlling said variable I-V characteristic such that when a light quantity incident on said radiation detector is increased said variable I-V characteristic means is controlled to allow a higher current flow therethrough.

2. A device for optically detecting the presence or absence of an object according to claim 1, wherein said variable I-V characteristic means includes a photosensitive resistor which also constitutes said radiation detector.

3. A device for optically detecting the presence or absence of an object according to claim 1, wherein said variable I-V characteristic means includes a parallel connection of a first current path and a second current path, and wherein said second current path includes an active element having I-V characteristic changed by a bias applied thereto.

4. A device for optically detecting the presence or absence of an object according to claim 3, wherein said first current path includes a constant voltage element or a resistor.

5. A device for optically detecting the presence or absence of an object according to claim 3, wherein said first current path includes a constant voltage element a current through which abruptly increases when the voltage across said constant voltage element exceeds a predetermined voltage value, and wherein said second current path includes a three-terminal active element, and said three-terminal active element receives the output of said radiation detector circuit and assumes such a low impedance value that the voltage across said first and second terminals thereof may become smaller than said predetermined voltage value when said active element is driven.

6. A device for optically detecting the presence or absence of an object according to claim 5, wherein said constant voltage element includes at least one diode.

7. A device for optically detecting the presence or absence of an object according to claim 5, wherein said constant voltage element comprises at least one Zener diode.

8. A device for optically detecting the presence or absence of an object according to claim 5, wherein said three-terminal active element comprises at least one bipolar junction transistor.

9. A device for optically detecting the presence or absence of an object according to claim 5, wherein said three-terminal active element comprises at least one field effect transistor.

10. A device for optically detecting the presence or absence of an object according to claim 5, wherein said radiation detector circuit is connected between the control terminal of said three-terminal active element and one of said first or second terminals.

11. A combination comprising:
    a pair of power supply terminals;
    a series connection of a radiation source section and a bias section connected between said pair of power supply terminals, said radiation source section including a radiation source element, the quantity of light radiated by said radiation source element increasing with the current and the voltage drop across said radiation source element being nearly constant irrespective of the current, said bias section producing a voltage drop exceeding a predetermined level in response to a passage current exceeding a predetermined level;

a short-circuit path for by-passing said bias section, said short-circuit path including an active element; and a radiation detector section for supplying the output current to said short-circuit path, said radiation detector section including a radiation detector element for receiving the radiation from said radiation source element, whereby when the radiation from the radiation source element is applied to the radiation detector element, said active element in the short-circuit path becomes more conductive and thereby the quantity of light radiated by said radiation source element increases to sufficiently turn on said active element by positive feedback, whereas when the radiation from said radiation source element is interrupted from said radiation detector element, said active element turns off and the current flowing through said radiation source section flows through said bias section.

12. A combination according to claim 11, wherein said bias section comprises a constant voltage circuit.

13. A combination according to claim 12, wherein said constant voltage circuit includes a Zener diode.

14. A combination according to claim 12, wherein said constant voltage circuit includes a plurality of diodes connected in series.

15. A combination according to claim 11, wherein said bias section, said short-circuit section, and said radiation detector section are integrated on a single substrate.

16. Electronic components adapted to be used in a device for optically detecting the presence or absence of an object on an optical path, comprising:

a radiation source element having two electrodes for passing the main current therethrough and being capable of emitting a light ray along an optical path, the quantity of light radiated by said radiation source element being increased with an increase of the current level flowing therethrough; and variable current-voltage (I-V) characteristic means having two terminals for passing the main current therethrough, one of said two terminals being connected to one of said two electrodes of said radiation source element, the I-V characteristic of said variable I-V characteristic means being changed in response to a control signal which decreases in magnitude when an object traverse the optical path, in such a positive feed-back manner that the main current is decreased by the traverse of the object.

17. Electronic components according to claim 16, wherein said control signal is an optical signal, and said variable I-V characteristic means comprises a photosensitive element which reduces its resistance when it receives radiation from said radiation source element.

18. Electronic components according to claim 16, further comprising a radiation detector circuit which generates said control signal, and said variable I-V characteristic means further including a control terminal adapted to receive said control signal.

19. Electronic components according to claim 18, wherein said variable I-V characteristic means includes a parallel connection of an active circuit including a pair of current terminals as well as said control terminal and a load having a pair of current terminals.

20. Electronic components according to claim 19, wherein said load has constant voltage characteristics.

21. A device for optically detecting the presence or absence of an object according to claim 1, wherein when said control signal results in higher or lower current through said variable I-V characteristic means the radiation source has an increase or decrease in light emission, respectively.

22. A device for optically detecting the presence or absence of an object according to claim 1, wherein said radiation source circuit and said radiation detector circuit are coupled so as to have a positive feedback operating relationship.

* * * * *